C. S. LEONARD.
SHREDDING MACHINE.
APPLICATION FILED DEC. 1, 1911.

1,042,932.

Patented Oct. 29, 1912.

Charles S. Leonard,
Inventor by C. A. Snow & Co.
Attorneys

Witnesses

UNITED STATES PATENT OFFICE.

CHARLES STOKELY LEONARD, OF NEW ORLEANS, LOUISIANA.

SHREDDING-MACHINE.

1,042,932.

Specification of Letters Patent.

Patented Oct. 29, 1912.

Application filed December 1, 1911. Serial No. 663,277.

*To all whom it may concern:*

Be it known that I, CHARLES S. LEONARD, a citizen of the United States, residing at New Orleans, in the parish of Orleans and State of Louisiana, have invented a new and useful Shredding-Machine, of which the following is a specification.

This invention relates to machines for shredding either green or dry material such as cobs, corn, cane, bone and the like, one of the objects of the invention being to provide opposed series of revoluble shredding saws, the saws of one series rotating oppositely to the saws of the other series and the teeth on one series of saws being so disposed as to constitute anvils or holding means for the material being chopped or shredded by the teeth upon the other series of saws.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

Figure 1:
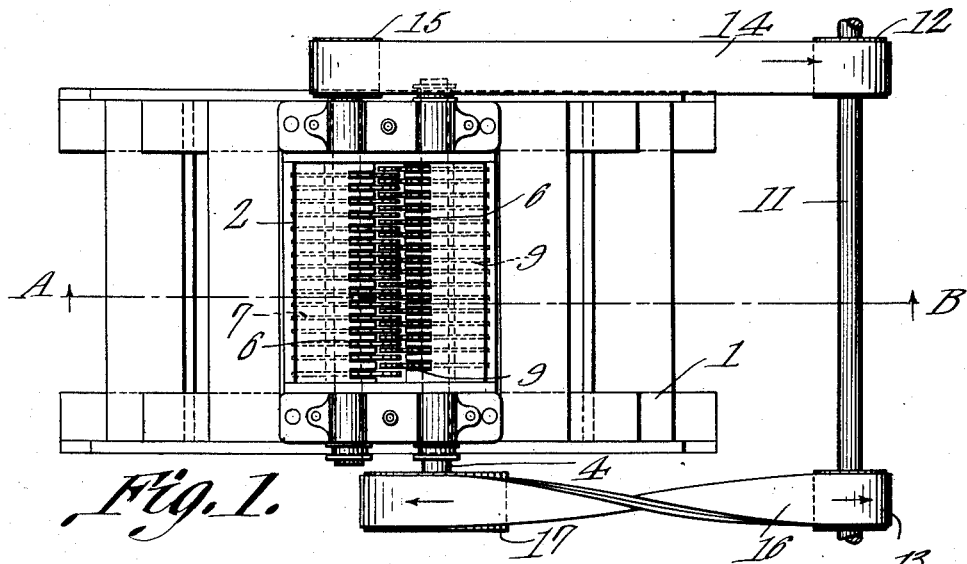
Figure 2:
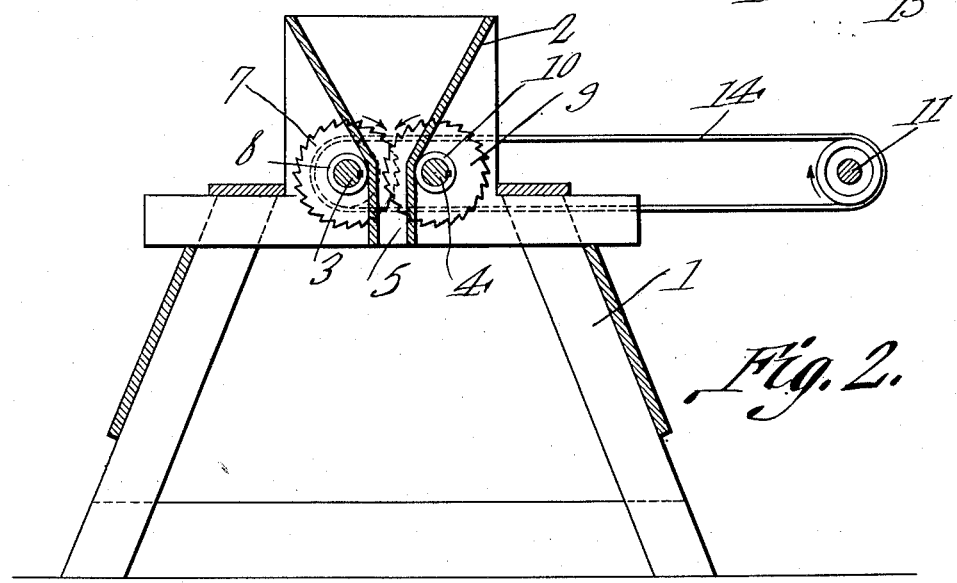
Figure 3:
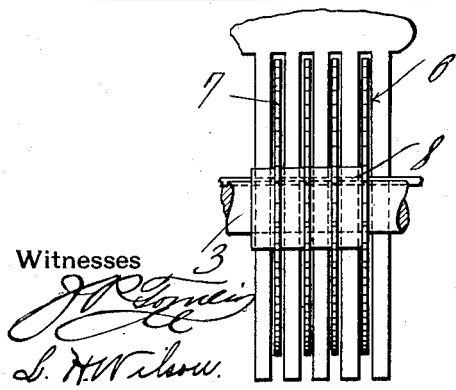

In said drawings:—Figure 1 is a plan view of the machine. Fig. 2 is a section on the line A—B Fig. 1. Fig. 3 is an elevation of a portion of one gang of saws.

Referring to the figures by characters of reference 1 designates a supporting structure having a hopper 2 thereon and journaled on this structure at opposite sides of the hopper are shafts 3 and 4. The outlet 5 extending downwardly from the hopper has a series of slots 6 in opposed walls thereof. A gang of saws 7 is arranged on shaft 3 and the saws of this gang are spaced apart by collars 8, the said saws and collars being keyed on the shaft so as to rotate therewith. The shaft 4 is provided with a gang of saws 9 spaced apart by collars 10 similar to the collars 8, said saws and collars being keyed on the shaft 4. Each of the saws is provided with chisel teeth of ordinary pitch but the pitch of the teeth of one gang is the reverse of the pitch of the teeth of the other gang and the two gangs of saws are adapted to rotate in opposite directions. The saws 7 are adapted to rotate approximately twice as fast as the saws 9 and in practice it is intended to have the saws 7 rotate 1,800 times per minute while the saws 9 make 900 revolutions per minute. Any desired means may be employed for rotating the shafts and the saws thereon and in the structure illustrated a drive shaft 11 has been provided, said shaft having pulleys 12 and 13 secured thereto. The pulley 12 drives a belt 14 which in turn actuates a pulley 15 secured to one end of shaft 3 while pulley 13 transmits motion through a twisted belt 16 to a pulley 17 on one end of shaft 4.

It will be understood that when material is fed between the saws 7 and 9 the backwardly moving teeth on the saws 9 will act as supports or anvils for the material while the more rapidly rotating teeth on the saws 7 will engage the material thus supported and cut it, the shredded material being discharged through the outlet 5.

It has been found by actual practice that by arranging the teeth in the manner shown and described and operating the saws at the relative speeds stated, it is possible to shred different kinds of material, whether dry or green and without danger of choking and injuring the mechanism. As the saws work within the slots 6, it will be seen that any material that might adhere to the teeth will be stripped therefrom by the walls of the slots and thus prevented from passing through the slots.

What is claimed is:—

A shredding machine including a hopper having an outlet, shafts journaled at opposite sides of the outlet and overhung by the hopper, a gang of spaced saws upon each shaft and extending through the slots in the adjacent side of the hopper, the saws of one gang projecting between the peripheral portions of the saws of the other gang, means for rotating the two gangs of saws in opposite directions, the saws of one gang being revoluble at a higher speed than the saws of the other gang, the teeth of the low speed saws being faced backwardly for supporting material engaged by the teeth of the high speed saws.

In testimony that I claim the foregoing as my own, I have hereto affixed my signature in the presence of two witnesses.

CHARLES STOKELY LEONARD.

Witnesses:
SAM. PARKER,
NORMAN PARKER.